Patented Dec. 5, 1939

2,181,915

UNITED STATES PATENT OFFICE 2,181,915

HYDROCARBON COMPOSITION

Raphael Rosen, Elizabeth, N. J., assignor to Standard Oil Development Company, a corporation of Delaware No Drawing. Application April 25, 1939,
Serial No. 269,911

9 Claims. (Cl. 87—9)

The present invention relates to improved oil compositions which are exposed to high temperature conditions as in automotive engines, and which are characterized by increased stability under such conditions; more specifically, it releates to lubricating oil, transformer oil, and grease compositions containing selected aliphatic metallo-organic stabilizing agents. The invention will be fully understood from the following description.

The effects on lubricating and similar oils of various metallo-organic agents containing a metal selected from the II, III, and V groups of the periodic table of elements, joined directly to a carbon atom of a hydrocarbon radical, are described in my copending application Ser. No. 719,603, filed April 7, 1934, of which the present application is a continuation-in-part. Said earlier copending application in its more specific aspects is directed particularly to metallo-organic compounds comprising an aromatic hydrocarbon radical.

Among the novel and improved metallo-organic agents may be mentioned generally the alkyl compounds of metals of the II, III, and V groups of the periodic table of elements. By the term "metallo-organic" it is intended to describe organic compounds in which the metallo element, or metal constituent, is directly joined to at least one carbon atom of an organic radical which may be a paraffinic or aliphatic radical.

The most important metals found useful in metallo-organic compound blending agents containing an alkyl hydrocarbon radical attached directly to the metal are: mercury, cadmium, zinc, aluminum, boron, thallium, bismuth, antimony, and arsenic.

In accordance with the present invention, compounds of such metals joined directly to carbon atoms of aliphatic groups with a total exclusion of aromatic or aryl groups are provided as highly useful blending agents for improving lubricating and similar oils. The aliphatic metallo-organic compounds of interest are formulated generally by:

where R represents one or more aliphatic groups, M represents the metal constituent joined to carbon atoms of the R groups, and X represents a univalent inorganic function or group which may or may not be present. The subscript $n$ denotes the number of aliphatic groups linked by one valence through carbon to M, and the subscript $v-n$ denotes the number of X groups attached to the metal in place of R groups to satisfy the valence number of $v$ of metal M. Thus when $v$ is equal to $n$, no X group is substituted for an R group. Of course, if the inorganic function is polyvalent, the $R_nM$ groups are varied to satisfy the particular valence of M.

The efficacy of the particular compounds for the purpose in hand depends on their composition and constitution. Important factors have been discovered with regard to the activity, stability, and solubility of these metallo-organic compounds. One of these factors is the presence of a nonmetallic inorganic function or negative group in substitution for an organic group bound to the metal atom in the metallo-organic compounds.

In accordance with the chief objects of the present invention, which is concerned with aliphatic metallo-organic compounds, that is, with such compounds containing a metallic element selected from groups II, III, and V of the periodic table of elements connected to a carbon atom of an aliphatic radical, which may be an alkyl, an alkylene, or an alicyclic radical, with aromatic or aryl groups excluded, a beneficial stabilizing influence is derived by the substitution of a negative or inorganic function for one or more of these organo aliphatic radicals, as previously mentioned. Suitable negative radicals for this purpose include chlorine, bromine, iodine, fluorine, sulfur, polysulfide, hydroxyl, hydrosulfide, thiocyanate, isothiocyanate, amine, substituted amines, amide, nitrate, phosphite, phosphate, carboxy, thiocarboxy, acyl, and thioacyl containing groups.

As to the organic portion of the compounds, the simple alkyl hydrocarbon radicals may be used, such as ethyl, methyl, propyl, butyl, and the like, whether straight chained or branch chained.

In addition to the influence of the negative substituent radicals, some stabilizing influence may be obtained by the arrangement of the hydrocarbon radicals; for example, although more than one of the valences of the metal may be attached to similar hydrocarbon radicals, in many instances, the stability is increased by having similar hydrocarbon radicals attached to the metal so as to make the compound symmetrical.

In judging the merits and effects of various metals, account has to be taken of thermal stability, spontaneous inflammability of their compounds, as well as of their activity for inhibiting oxidation and sluding of an oil. The preferred metals selected grom groups II, III, and V of the periodic table form suitable stable aliphatic metallo-organic compounds having the desired properties for improving lubricating oils. They are considered superior in these respects to metals of other groups. Although metals of group IV, particularly lead, are known to have some anti-sludging action, they have not shown sufficient oxidation inhibiting activity and are less suitable for some metal alloys in engine bearings. Like discriminations have to be made against other metals depending upon the use of the oil blends containing their compounds.

Considering the relative merits of metals in the chosen groups, it is to be noted that there are differences in activity which are not entirely regular, but which can be fairly accurately summarized as follows:

In group II mercury is by far the leading metal for desired properties.

In group III the metals thallium, indium, and gallium, can be used, though they are rare. Stable compounds of aluminum and boron are also useful but limited in number. Among the exceptionally stable alkyl boron compounds are those which contain a coordinated linkage between boron and an inorganic molecule, as in trimethyl borane ammine $(CH_3)_3B \cdot NH_3$.

In group V preference is given to the elements bismuth, antimony, and arsenic in the order named.

There are numerous types of stable aliphatic metallo-organic compounds which can be derived from the mentioned metallic elements for the purposes of this invention. Those having but one metal atom may contain one or more R groups and one or more X groups depending on the valence of the metal and the inherent stability of the compound, the R group being aliphatic or alicyclic, and the X group being a halogen or almost any acid radical or negative inorganic radical, as previously described. Two main classes of organo-metallic compounds are commonly known as simple and mixed, the simple class being understood to contain only R groups attached to the metal M as in $R_nM$, whereas the mixed class has both R and X groups attached to the metal, as in $R_nMX$, with $n$ representing the metal valences attached to the organic groups. The simple types may be further divided into symmetrical RMR and unsymmetrical RMR' types. The metal may be an integral part of a heterocyclic structure like pentamethylene mercury $(CH_2)_5Hg$.

From the foregoing description it will be clear that any combination of the metallic atom with various aliphatic and negative inorganic radicals is satisfactory for the present purposes, but it is considered desirable to list specifically compounds which have been found to be particularly valuable for the present purposes.

True organo-mercury compounds which by definition contain carbon to mercury linkages, and which have appreciable and sufficient solubility and stability in hydrocarbon oils for the objects described include the following types of compounds having the general formulae $HgR_2$, $RHgR'$, $RHgX$, $(RHg)_2Y$ where R and R' are the aliphatic groups, X is, for example, a halide (Cl, Br, etc.) or any of the negative inorganic univalent radicals mentioned, and Y symbolizes a bivalent inorganic function, e. g., oxygen or sulfur. The aliphatic group R may be unsaturated.

Specific examples of these types of compounds are di-isopropyl mercury, di-tertiary butyl mercury, di-isoamyl mercury, di-normal amyl mercury, di-normal heptyl mercury, di-secondary octyl mercury, di-vinyl mercury, and ethyl mercury nitrate.

From among these types of compounds, di-n-butyl mercury, n-butyl mercuric nitrate, n-butyl mercuric oxide, and similar compounds have been blended with petroleum distillates more viscous than kerosene in concentrations of about 1% and higher. Thus with respect to solubility and stability in general, alkyl mercury compounds have been found more suitable when the alkyl group contains at least 3 carbon atoms.

Compounds of thallium which illustrate this invention are represented by tri-alkyl thallium, $R_3Tl$, and also by the $R_2TlX$ and $RTlY$ types of compounds.

Similarly, the various types of organo-antimony compounds are indicated: $R_3Sb$, $R_2SbX$, $R_3SbX_2$, $R_4SbX$, $R_3SbY$, with R being an aliphatic group such as a straight chain or branched alkyl group, X being a halogen or other inorganic univalent function, e. g., nitrate, hydroxide, nitrile, or nitro, etc., Y being a bivalent inorganic function. Examples of these alkyl antimony compounds are: $(C_4H_9)_3Sb$, $(C_3H_7)_3SbO$, $(C_4H_9)_3SbCl_2$, $(C_4H_9)_4SbCl$.

The quaternary stibonium compounds of the type $R_4SbX$ have been found to be satisfactorily stable and soluble in hydrocarbon oils. Compounds of this type which have been tested in oil blends are the hydroxide, chloride, acetate, iodide, and nitrate of tri-n-butyl methyl stibonium.

The bismuth and arsenic compounds are, in general, analogues of the mentioned antimony compounds. Bismuth forms stable alkyl bismuthines, and quaternary compounds and other bismuthic compounds. Among the most stable bismuthic compounds are the $R_3BiX_2$ compounds. The organo-arsenic compounds similarly include alkyl types, but the arsonium compounds which show more stability are preferred.

While the exact nature of these various compounds and the mechanisms by which they improve a lubricating oil are not particularly well understood, it is observed that they appear to show in greater or less degree the property of decreasing the sludging tendency of the oil, which means that decomposition products formed under their influence, whatever their nature, are, for the most part, freely soluble, or, at least, dispersible in the oil, and that the tendency toward precipitation is thus greatly diminished.

No explanation of this behavior is presented, but it has been observed that the addition of such compounds to lubricating oils resulted in a decrease in sludge-forming tendency of those oils which ordinarily produce a substantial quantity of sludge. It is not desired to infer that sludge formation is the result of oxidation alone, as it has been believed at times, and it is specifically desired not to limit the present invention to any theory of the chemical action involved.

The amounts of the agents which are used are, in all instances, minute, as much as 0.01 or 0.02% producing noticeable effects. It is generally desirable, however, to use 0.2% to 0.5%, and, it is rare that more than 1% is required. The substances mentioned are effective in many different types of petroleum products, having boiling ranges above that of kerosene, irrespective of the type or source, whether derived from paraffin or naphthene or various mixed base crudes, and whether refined by acid, clay, solvent extraction, hydrogenation, destructive hydrogenation, or otherwise, including the "white oils" refined to a high degree with strong or concentrated sulfuric acid.

As previously noted, one of the principal properties of the substances mentioned is their efficacy in reducing tendency to sludging, but it will be realized that in no case is this tendency absolutely eliminated, and in many cases it is desirable to add substances of the class of sludging dispersing agents to the oil compositions containing metallo-organic agents.

In order to determine the relative merits of the metallo-organic compounds, the following tests were conducted:

Sligh tests were carried out according to the A. S. T. M. procedure modified in having the oil composition subjected to heat and oxidation for a period of 24 hours instead of only 2 hours. See Proc. Am. Soc. for Testing Materials, 964-II (1924).

Rate of oxidation was determined by continually passing oxygen through a 10 cc. sample of the oil composition at a constant rate and determining the amount of absorbed oxygen at 15 minute intervals.

The cone test, which is found to best accord with the ordinary operations, represents the naphtha-insoluble residue produced in 2 hours when the oil composition tested is allowed to flow at a rate of 30 cc. per hour around a groove in an iron cone of standardized dimensions, the cone being held at a temperature of 250° C.

From results obtained in a series of experimental determinations on the efficacy of various metallo-organic compounds for reducing the Sligh number, initial oxidation number, and cone test residue, the observations made are summarized as follows:

1. The metal in the metallo-organic compound plays the most significant role in the effect of the compound upon the cone test rating for an oil blended with the compound. The test data show that organo-mercury and organo-bismuth compounds are superlatively effective in this respect.

2. The multivalent heavy metals classified in the right hand families or columns of the periodic table of elements, i. e., metals having variable valences in being capable of being oxidized to more than one state of oxidation, are the preferred elements to be used as the metal constituent of the organo-metallic blending agent from the standpoint of stability and improvements of the oil composition. Therefore, the preferred metals are: mercury (group II); thallium (group III); bismuth, antimony, and arsenic (group V).

3. The effectiveness of the organo-metallic compounds is increased somewhat in proportion to the concentrations in which they are used. An example is the use of an organo-bismuthine in a lubricating oil having a cone test rating of 0.36; whereby .02% of the bismuthine lowers this rating to 0.24; 0.1% decreases the cone test rating to 0.16; and 0.2% of the bismuthine decreases the cone test rating to 0.14.

4. The presence of alkyl groups in place of aryl groups in the metallo-organic compounds increases the solubility of these compounds in hydrocarbon oils, thereby permitting higher concentrations to be used.

5. The presence of negative inorganic groups in the metallo-organic compounds aid in stabilizing the compounds.

Additional benefits have been experienced by blending the described addition agents in small amounts with hydrocarbon oils comparatively more viscous than kerosene. For example, enhanced oiliness is imparted by some of these agents, particularly those containing certain negative groups such as halogens; some to a greater degree than others are believed to form thin protective coatings on the metal parts of engines.

In the practice of this invention, oil-soluble compounds which can be most safely and conveniently handled are selected. Such compounds, in general, will contain larger aliphatic groups which diminish sensitivity to decomposition by air and decrease the volatility of the compounds. The selection of a particular compound or combination of compounds to be blended with a hydrocarbon oil is dependent on the particular use of the composition. For service at high temperatures, the less volatile metallo-organic compounds should be employed. But for some purposes, the addition agent is permissibly more sensitive to oxidation, for instance, when the oil composition functions as a lubricant at relatively low temperatures and with protection from air, particularly, if the composition is employed first as a lubricant protected in this manner and is subsequently used as a fuel.

It is to be understood that the aliphatic organo-metallic compounds featured by this invention may be used to preserve lubricants of all types from deterioration by oxidation or heat, although their chief use is in motor lubricants comprising largely petroleum hydrocarbon oils characterized by viscosities starting at 150 Saybolt seconds at 100° F., as in an S. A. E. No. 10 lubricating oil. The oils to be improved may be much more viscous as in semi-fluid lubricants, or less viscous, as in non-viscous lubricants which generally have viscosities in the range of 30 to about 150 Saybolt seconds at 100° F., i. e., more viscous than kerosene, however.

Other additive agents may be incorporated in the oil compositions together with the selected aliphatic metallo-organic agents, e. g., agents which aid in further solubilizing and stabilizing the metallo-organic compounds, corrosion inhibitors, oiliness agents, and oxidation inhibitors of other types, dyes, soaps, thickeners, viscosity index improvers, pour point depressents, etc.

The present invention is not limited to any particular addition agent nor to any theory on the effect of these substances nor to the particular amounts used.

I claim:

1. A composition of matter comprising a hydrocarbon oil of the type boiling above kerosene containing an oil-soluble metallo-organic agent, the metal constituent of said agent being directly joined to a carbon atom of an aliphatic radical and selected from the groups II, III, and V of the periodic table of elements.

2. A composition of matter comprising a hydrocarbon oil of the type boiling above kerosene, containing an oil-soluble metallo-organic agent, the metal constituent of said agent being directly joined to a carbon atom of an alkyl radical and selected from the heavy elements with variable valence classified in the right hand families of the groups II, III, and V of the periodic table of elements.

3. A composition of matter according to claim 2, in which the metal constituent of said metallo-organic agent is attached to organic radicals which exclude aryl groups.

4. A composition of matter according to claim 2, in which the metal constituent of said metallo-organic agent is attached to organic radicals which exclude aryl groups and to a negative inorganic radical.

5. A composition of matter comprising a hydrocarbon oil of the type boiling above kerosene, containing an oil-soluble metallo-organic agent, the metal constituent of said agent being directly joined to a carbon atom of an alkylene radical and being selected from the multivalent elements classified in the right hand columns of groups II, III, and V of the periodic table of elements.

6. A composition of matter comprising a hydrocarbon oil of the type boiling above kerosene blended with an alkyl mercury compound in which the alkyl group is attached directly to mercury by a carbon-to-metal bond.

7. A composition of matter according to claim 6 in which the alkyl group attached directly to mercury contains at least 3 carbon atoms.

8. A composition of matter comprising a hydrocarbon oil of the type boiling above kerosene blended with an alkyl antimony compound in which the alkyl group is attached directly to the antimony by a carbon-to-metal bond.

9. A composition of matter comprising a hydrocarbon oil of the type boiling above kerosene blended with an alkyl bismuth compound in which the alkyl group is attached to the bismuth by a carbon-to-metal bond.

RAPHAEL ROSEN.